No. 862,753. PATENTED AUG. 6, 1907.
H. H. PILCHER.
THERMOSTAT.
APPLICATION FILED APR. 28, 1906.

WITNESSES:

INVENTOR
H. H. Pilcher
BY
Onward Brock
ATTORNEYS

UNITED STATES PATENT OFFICE.

HERBERT H. PILCHER, OF MULLINS, TENNESSEE.

THERMOSTAT.

No. 862,753.  Specification of Letters Patent.  Patented Aug. 6, 1907.

Application filed April 28, 1906. Serial No. 314,262.

*To all whom it may concern:*

Be it known that I, HERBERT H. PILCHER, a citizen of the United States, residing at Mullins, in the county of Shelby and State of Tennessee, have invented a new and useful Improvement in a Thermostat, of which the following is a specification.

This invention relates to a thermostat especially designed for the purpose of regulating the size of the flame in liquid fuel burners employed in generating steam or in connection with super-heaters, thereby holding the temperature of the steam at the desired point.

The invention consists of inclosing within a perforated tube which tube is exposed to the steam, a thermostatic bar, which bar is brought into direct contact with the steam by reason of the steam passing through the perforations of the tube. Certain fuel controlling means are actuated by the thermostatic bar.

Figure 1:
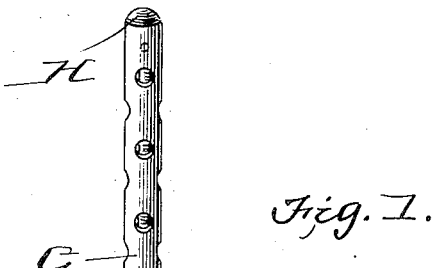
Figure 2:
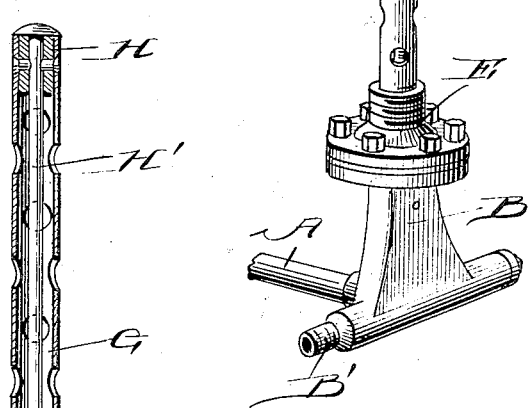
Figure 3:
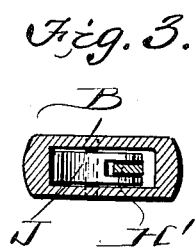
Figure 4:
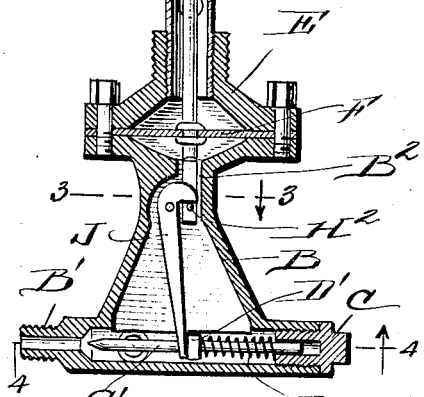
Figure 4:
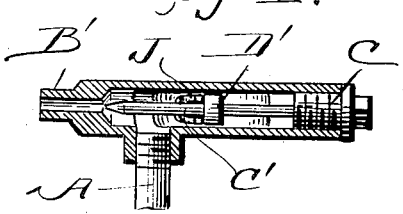

In the drawings forming a part of this specification Figure 1 is a detail perspective view of the device. Fig. 2 is a vertical section therethrough. Fig. 3 is a section on the line 3—3 of Fig. 2. Fig. 4 is a section on the line 4—4 of Fig. 2.

In these drawings A represents a supply pipe through which a liquid fuel enters a suitable casing B. This casing B is provided with an outlet B′ through which the fuel is discharged on its way to any suitable burner.

In the end of the casing opposite the discharge B′ is threaded a sleeve C, closed at its outer end. A needle valve C′ has one end slidably held in the sleeve C while its opposite tapered end is adapted to close the discharge opening, and by its position relative to said opening controls the amount of fuel passing to the burner.

A coil spring D is carried by the needle valve C′ and bears at one end upon the sleeve C and at the other end upon a suitable stop D′, the tendency of this spring being to normally close the discharge opening by forcing the needle valve C′ to its seat. The upper portion of the casing B is concaved, the concavity being centrally provided with an opening B² which communicates with the interior of the casing B. Upon the casing B is secured a conical casing E and in the chamber formed by the upper portion of the casing B, and the casing E, is placed a diaphragm F, which is preferably of copper. This diaphragm is firmly clamped between the casing E and the casing B and not only prevents the escape of steam into the casing B, but also serves as a tension device as will hereafter appear.

A perforated tube G has its lower end threaded into the casing E, and is closed by a suitable plug H at its upper end. A copper thermostatic bar H′, has its upper end secured and held in the plug H, and this bar passes longitudinally through the tube G and also passes through the diaphragm F, which is tightly secured to the bar, and the bar also extends downwardly through the opening B², into the casing B and is provided near its lower end with a pin H². An angled lever J is pivoted within the casing B and the angled or hook end of the lever J is adapted to be normally in engagement with the pin H², while the other end of the lever J is normally in engagement with the stop D′.

The action of the device is as follows:—Steam circulating through the tube G will come into direct contact with the copper bar H′ and while this bar will normally hold the lever J in such a position that the needle valve will be forced farther into the sleeve C opening the discharge, as shown in Figs. 2 and 4, as the temperature of the bar H′ rises it will lengthen by reason of its expansion and the downward movement of the pin H² will permit the lower end of the lever J to swing toward the discharge opening and thereby permit the needle valve C′ to close more or less the said opening, thereby regulating the amount of fluid passing from the casing. Should the temperature drop below the desired point, the contraction of the bar H′ will lift the pin H² thus drawing the hook end of the lever J slightly upward and swinging the lower end toward the sleeve C opening the discharge outlet and increasing the flow of fuel to the burner.

It will be obvious that the diaphragm F will not only prevent steam from passing into the casing B but having steam pressure upon its upper side, it will act as a tension for the bar H′.

Having thus fully described my invention, what I claim as new and desire to secure by Letters Patent, is:—

1. A thermostatic device for regulating steam temperature comprising a tube having openings formed therein, a casing in which one end of said tube is secured, a steam tight diaphragm arranged adjacent the said end of the tube, a thermostatic bar secured at the end of the tube opposite the diaphragm and passing through the tube, and through the diaphragm said bar being secured to the diaphragm, and means carried by the free end portion of the bar adapted to actuate fuel controlling mechanism.

2. A device of the kind described comprising a casing, means for admitting and discharging a liquid fuel from said casing, a spring pressed valve controlling the discharge of fuel from the casing, a second casing mounted upon the first mentioned casing, a chamber being formed between the two casings, a diaphragm arranged in said chamber and held between the two casings, a perforated tube having one end secured in the second mentioned casing and opening into the said chamber, a thermostatic bar secured in the tube and extending therethrough and passing also through the diaphragm the diaphragm being secured to the bar and having steam pressure above it, and a lever adapted to be actuated by the bar and engaging with the said valve, as and for the purpose set forth.

HERBERT H. PILCHER.

Witnesses:
ROBT. VANCE,
T. W. WILSON.